US012634769B2

(12) United States Patent
Narayana Pillai et al.

(10) Patent No.: US 12,634,769 B2
(45) Date of Patent: May 19, 2026

(54) SYSTEMS AND METHODS FOR TIME DISTRIBUTED PRB SCHEDULING PER NETWORK SLICE

(71) Applicant: Rakuten Symphony, Inc., Tokyo (JP)

(72) Inventors: Deepu Narayana Pillai, Bangalore (IN); Jagadish Damodar, Bangalore (IN); Dhivya Balan, Bangalore (IN); Aman Gautam, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 575 days.

(21) Appl. No.: 18/018,141

(22) PCT Filed: Dec. 27, 2022

(86) PCT No.: PCT/US2022/054058
§ 371 (c)(1),
(2) Date: Jan. 26, 2023

(87) PCT Pub. No.: WO2024/144761
PCT Pub. Date: Jul. 4, 2024

(65) Prior Publication Data
US 2024/0251301 A1     Jul. 25, 2024

(51) Int. Cl.
*H04W 28/26*          (2009.01)
*H04W 16/04*          (2009.01)
*H04W 28/08*          (2023.01)
*H04W 28/18*          (2009.01)

(52) U.S. Cl.
CPC ........... *H04W 28/26* (2013.01); *H04W 16/04* (2013.01); *H04W 28/08* (2013.01); *H04W 28/18* (2013.01)

(58) Field of Classification Search
None
See application file for complete search history.

(56) References Cited

U.S. PATENT DOCUMENTS

| | | | |
|---|---|---|---|
| 2017/0079059 A1* | 3/2017 | Li | H04W 16/02 |
| 2021/0377814 A1 | 12/2021 | Sillanpaa | |
| 2022/0124560 A1 | 4/2022 | Yeh et al. | |

FOREIGN PATENT DOCUMENTS

| | | | | |
|---|---|---|---|---|
| CN | 111970721 B | * | 8/2022 | H04W 24/02 |
| WO | WO-2019190527 A1 | * | 10/2019 | H04L 43/0852 |

OTHER PUBLICATIONS

International Search Report dated Apr. 10, 2023 in Application No. PCT/US22/54058.
Written Opinion of the International Searching Authority dated Apr. 10, 2023 in Application No. PCT/US22/54058.

(Continued)

*Primary Examiner* — Jay L Vogel
(74) *Attorney, Agent, or Firm* — Sughrue Mion, PLLC

(57) ABSTRACT

A method of physical resource block (PRB) scheduling includes determining a number of PRBs to be allocated in a predetermined window length to a plurality of slices for each slot of a plurality of slots within the predetermined window length, allocating the number of PRBs to at least one of the plurality of slices in one slot of the plurality of slots, determining whether at least one slice of the plurality of slices satisfies at least one predetermined PRB allocation condition, and disabling the at least one slice based on determining that the at least one slice satisfies the at least one predetermined PRB allocation condition.

20 Claims, 6 Drawing Sheets

(56) References Cited

OTHER PUBLICATIONS

Ferrús et al., "Accepted From Open Call On 5G Radio Access Network Slicing: Radio Interface Protocol Features and Configuration", IEEE Communications Magazine, May 2018, pp. 184-192.

* cited by examiner

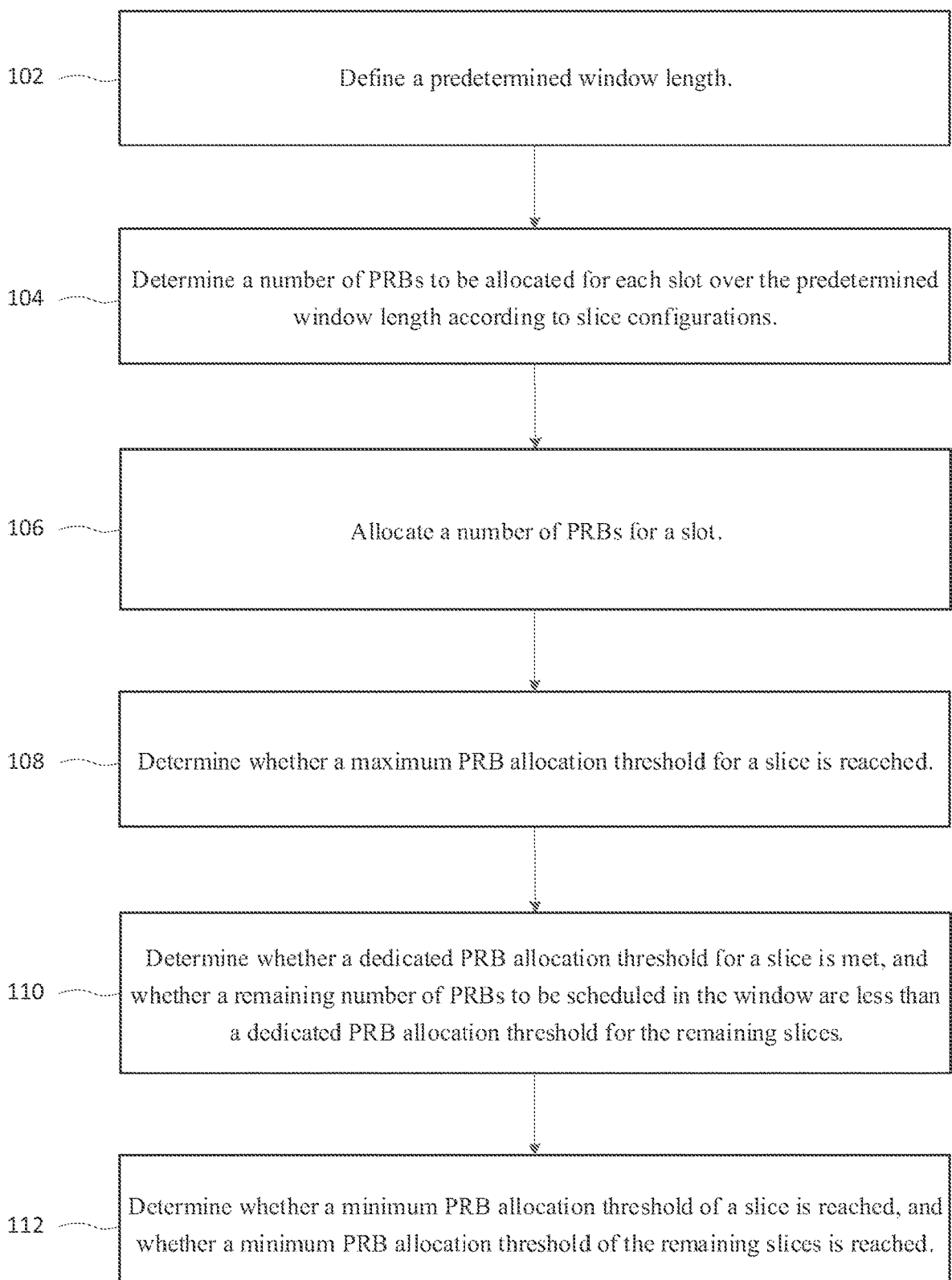

102 — Define a predetermined window length.

104 — Determine a number of PRBs to be allocated for each slot over the predetermined window length according to slice configurations.

106 — Allocate a number of PRBs for a slot.

108 — Determine whether a maximum PRB allocation threshold for a slice is reached.

110 — Determine whether a dedicated PRB allocation threshold for a slice is met, and whether a remaining number of PRBs to be scheduled in the window are less than a dedicated PRB allocation threshold for the remaining slices.

112 — Determine whether a minimum PRB allocation threshold of a slice is reached, and whether a minimum PRB allocation threshold of the remaining slices is reached.

FIG. 1

| Slot | Remaining PRBs in Window | Slice | PRBs Allocated | Minimum | Dedicated | Maximum | Minimum PRB of remaining slices | Dedicated PRBs for remaining slices | Operation 108 | Operation 110 | Operation 112 | SLICE ENABLE/DISABLE |
|---|---|---|---|---|---|---|---|---|---|---|---|---|
| 1 | 1000 | S1 | 50 | 100 | 50 | 600 | 900 | 400 | FALSE | FALSE | FALSE | EN |
| | | S2 | 20 | 200 | 100 | 800 | 800 | 350 | FALSE | FALSE | FALSE | EN |
| | | S3 | 30 | 400 | 300 | 1000 | 600 | 150 | FALSE | FALSE | FALSE | EN |
| | | S4 | 0 | 300 | 0 | 1000 | 700 | 450 | FALSE | FALSE | FALSE | EN |
| 2 | 900 | S1 | 50 | 50 | 0 | 550 | 850 | 350 | FALSE | FALSE | FALSE | EN |
| | | S2 | 20 | 180 | 80 | 780 | 720 | 270 | FALSE | FALSE | FALSE | EN |
| | | S3 | 30 | 370 | 270 | 970 | 530 | 80 | FALSE | FALSE | FALSE | EN |
| | | S4 | 0 | 300 | 0 | 1000 | 600 | 350 | FALSE | FALSE | FALSE | DIS |
| 3 | 800 | S1 | 0 | 0 | 0 | 500 | 800 | 300 | FALSE | FALSE | TRUE | EN |
| | | S2 | 50 | 160 | 60 | 760 | 640 | 240 | FALSE | FALSE | FALSE | EN |
| | | S3 | 30 | 340 | 240 | 940 | 460 | 60 | FALSE | FALSE | FALSE | EN |
| | | S4 | 20 | 300 | 0 | 1000 | 500 | 300 | FALSE | FALSE | FALSE | DIS |
| 4 | 700 | S1 | 0 | 0 | 0 | 500 | 700 | 220 | FALSE | FALSE | TRUE | EN |
| | | S2 | 50 | 110 | 10 | 710 | 590 | 210 | FALSE | FALSE | FALSE | EN |
| | | S3 | 30 | 310 | 210 | 910 | 390 | 10 | FALSE | FALSE | FALSE | EN |
| | | S4 | 20 | 280 | 0 | 980 | 420 | 220 | FALSE | FALSE | FALSE | DIS |
| 5 | 600 | S1 | 0 | 0 | 0 | 500 | 600 | 180 | FALSE | FALSE | TRUE | EN |
| | | S2 | 50 | 60 | 0 | 660 | 540 | 130 | FALSE | FALSE | FALSE | EN |
| | | S3 | 30 | 280 | 180 | 880 | 320 | 0 | FALSE | FALSE | FALSE | EN |
| | | S4 | 20 | 260 | 0 | 980 | 340 | 180 | FALSE | FALSE | FALSE | EN |
| 6 | 500 | S1 | 0 | 0 | 0 | 500 | 500 | 150 | FALSE | FALSE | TRUE | DIS |

FIG. 2

| | | | | | | | | | | | | |
|---|---|---|---|---|---|---|---|---|---|---|---|---|
| | | S2 | 50 | 10 | 0 | 610 | 490 | 150 | FALSE | FALSE | FALSE | EN |
| | | S3 | 30 | 250 | 150 | 850 | 250 | 0 | FALSE | FALSE | FALSE | EN |
| | | S4 | 20 | 240 | 0 | 940 | 260 | 150 | FALSE | FALSE | FALSE | EN |
| 7 | 400 | S1 | 0 | 0 | 0 | 500 | 440 | 120 | FALSE | FALSE | TRUE | DIS |
| | | S2 | 0 | 0 | 0 | 560 | 440 | 120 | FALSE | FALSE | TRUE | DIS |
| | | S3 | 30 | 220 | 120 | 820 | 220 | 0 | FALSE | FALSE | FALSE | EN |
| | | S4 | 70 | 220 | 0 | 920 | 220 | 120 | FALSE | FALSE | FALSE | EN |
| 8 | 300 | S1 | 0 | 0 | 0 | 500 | 340 | 90 | FALSE | FALSE | TRUE | DIS |
| | | S2 | 0 | 0 | 0 | 560 | 340 | 90 | FALSE | FALSE | TRUE | DIS |
| | | S3 | 30 | 190 | 90 | 790 | 150 | 0 | FALSE | FALSE | FALSE | EN |
| | | S4 | 70 | 150 | 0 | 850 | 190 | 90 | FALSE | FALSE | FALSE | EN |
| 9 | 200 | S1 | 0 | 0 | 0 | 500 | 240 | 60 | FALSE | FALSE | TRUE | DIS |
| | | S2 | 0 | 0 | 0 | 560 | 240 | 60 | FALSE | FALSE | TRUE | DIS |
| | | S3 | 30 | 160 | 60 | 760 | 80 | 0 | FALSE | FALSE | FALSE | EN |
| | | S4 | 70 | 80 | 0 | 780 | 160 | 60 | FALSE | FALSE | FALSE | EN |
| 10 | 100 | S1 | 0 | 0 | 0 | 500 | 140 | 30 | FALSE | FALSE | TRUE | DIS |
| | | S2 | 0 | 0 | 0 | 560 | 140 | 30 | FALSE | FALSE | TRUE | DIS |
| | | S3 | 100 | 130 | 30 | 730 | 10 | 0 | FALSE | FALSE | FALSE | EN |
| | | S4 | 0 | 10 | 0 | 710 | 130 | 30 | FALSE | FALSE | FALSE | EN |

FIG. 2
(Continued)

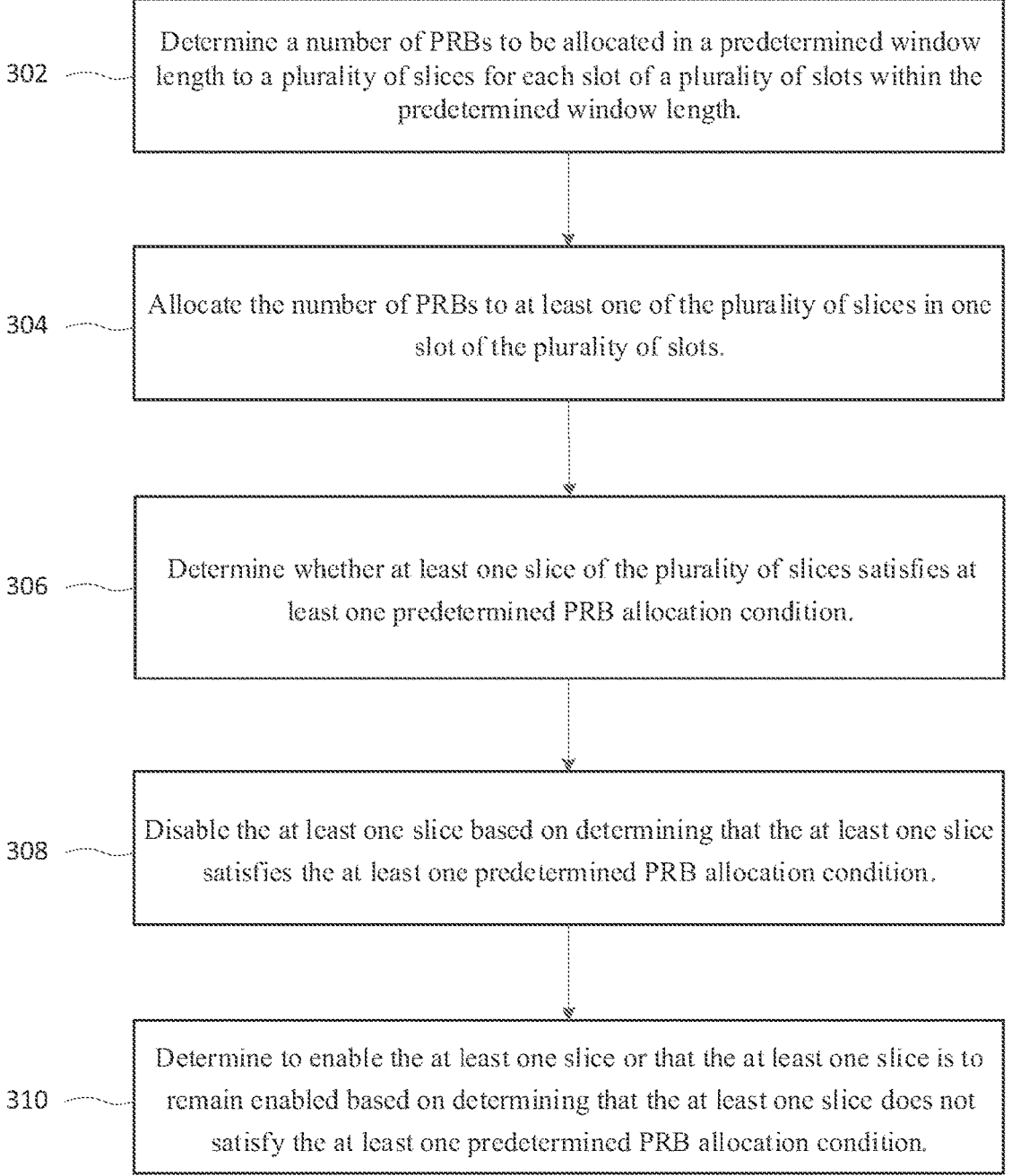

302 — Determine a number of PRBs to be allocated in a predetermined window length to a plurality of slices for each slot of a plurality of slots within the predetermined window length.

304 — Allocate the number of PRBs to at least one of the plurality of slices in one slot of the plurality of slots.

306 — Determine whether at least one slice of the plurality of slices satisfies at least one predetermined PRB allocation condition.

308 — Disable the at least one slice based on determining that the at least one slice satisfies the at least one predetermined PRB allocation condition.

310 — Determine to enable the at least one slice or that the at least one slice is to remain enabled based on determining that the at least one slice does not satisfy the at least one predetermined PRB allocation condition.

FIG. 3

SYSTEMS AND METHODS FOR TIME DISTRIBUTED PRB SCHEDULING PER NETWORK SLICE

This Application is a National Stage of International Application No. PCT/US2022/54058 filed Dec. 27, 2022.

1. FIELD

Apparatuses and methods consistent with example embodiments of the present disclosure relate to physical resource block (PRB) scheduling for network slices.

2. DESCRIPTION OF RELATED ART

In related art, PRBs are scheduled to network slices according to a per-slice scheduler. Based on targets for the slices (e.g., ratios of PRB allocations), the per-slice scheduling technique is complex, and meeting various Quality of Service (QOS) and proportional fairness (PFM) standards is difficult to achieve while maintaining minimal wasting of bandwidth or PRB resources.

SUMMARY

According to embodiments, systems and methods are provided for physical resource block (PRB) scheduling for network slices over a window length.

According to an aspect of the disclosure, a method of PRB scheduling may include determining a number of PRBs to be allocated in a predetermined window length to a plurality of slices for each slot of a plurality of slots within the predetermined window length, allocating the number of PRBs to at least one of the plurality of slices in one slot of the plurality of slots, determining whether at least one slice of the plurality of slices satisfies at least one predetermined PRB allocation condition, and disabling the at least one slice based on determining that the at least one slice satisfies the at least one predetermined PRB allocation condition.

According to an aspect of the disclosure, a system for PRB scheduling may include at least one memory storing instructions and at least one processor configured to execute the instructions to determine a number of PRBs to be allocated in a predetermined window length to a plurality of slices for each slot of a plurality of slots within the predetermined window length, allocate the number of PRBs to at least one of the plurality of slices in one slot of the plurality of slots, determine whether at least one slice of the plurality of slices satisfies at least one predetermined PRB allocation condition, and disabling the at least one slice based on determining that the at least one slice satisfies the at least one predetermined PRB allocation condition.

According to an aspect of the disclosure, a non-transitory computer-readable storage medium may store instructions that, when executed by at least one processor, cause the at least one processor to determine a number of PRBs to be allocated in a predetermined window length to a plurality of slices for each slot of a plurality of slots within the predetermined window length, allocate the number of PRBs to at least one of the plurality of slices in one slot of the plurality of slots, determine whether at least one slice of the plurality of slices satisfies at least one predetermined PRB allocation condition, and disabling the at least one slice based on determining that the at least one slice satisfies the at least one predetermined PRB allocation condition.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 1 is a flowchart of a method for physical resource block (PRB) scheduling for network slices, according to an embodiment;

FIG. 2 is a table showing an example implementation of a slice configuration over a predetermined window length, according to an embodiment;

FIG. 3 is a flowchart of a method of PRB scheduling, according to an embodiment;

DETAILED DESCRIPTION

Figure 4:
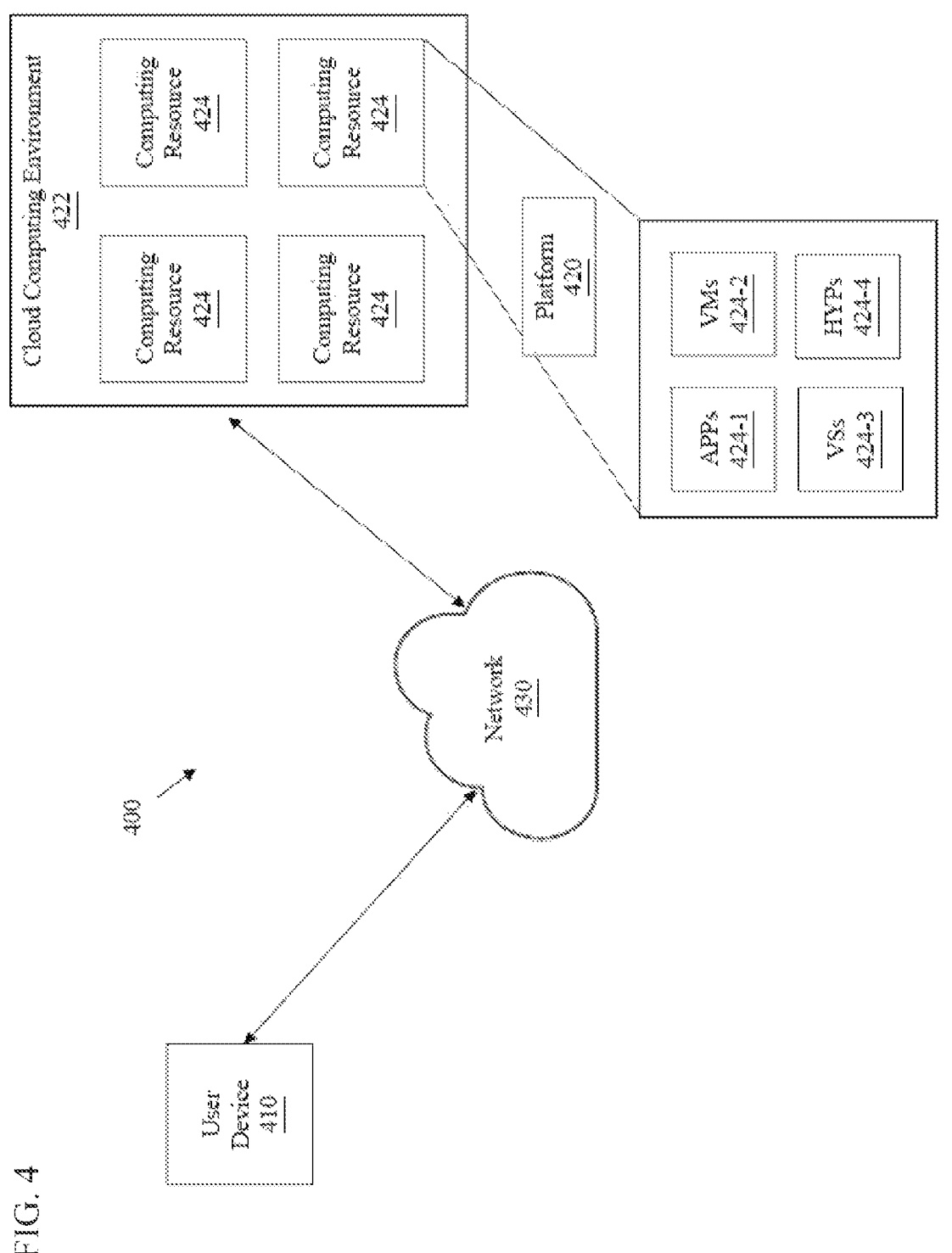
FIG. 4 is a diagram of an example environment in which systems and/or methods, described herein, may be implemented.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system for physical resource block (PRB) scheduling. The system may determine a number of PRBs to be allocated in a predetermined window length to a plurality of slices for each slot of a plurality of slots within the predetermined window length, allocate the number of PRBs to at least one of the plurality of slices in one slot of the plurality of slots, determine whether a slice of the plurality of slices satisfies at least one predetermined PRB allocation condition, and disable the slice based on determining that the slice satisfies the at least one predetermined PRB allocation condition.

In determining the at least one predetermined PRB allocation condition, the system may determine whether a maximum PRB allocation threshold for the slice is reached. The system may determine whether a first dedicated PRB allocation threshold for the slice is reached, and determine whether a remaining number of PRBs to be allocated within the predetermined window length is less than a second dedicated PRB allocation threshold for remaining slices of the plurality of slices other than the slice. The system may determine whether a first minimum PRB allocation threshold for the slice is reached, and determine whether a second minimum PRB allocation threshold for remaining slices of the plurality of slices other than the slice is reached.

Thus, the system and method may be implemented as a single pass schedule rather than a per-slice scheduler. In order to avoid the complexity of handling the network slice scheduling failures (e.g., failures of per-slice schedulers) and multiple iterations for user equipments (UEs), the provided system and method may schedule PRBs per slice over a predetermined time period instead of meeting the targets for every slot. Thus, a single pass scheduler with less computation complexity may be able to perform better and more efficiently to achieve higher PRB utilization, meet proportional fairness metric (PFM) compliance, and achieve slicing thresholds together. The provided system and method may make a decision for enabling a slice at the start of a slot based on aggregated PRB statistics over a configuration window (e.g., a predetermined window length, a predetermined time length, etc.) and process a particular UE or bearer from the PFM list only if a corresponding slice is enabled for the slot scheduling. If the targets for a particular slice are met (e.g., the allocation ratios), the system may deprioritize the slice until other slices meet their corresponding targets.

Network slicing may refer to a feature which allows different layering and different network flows. A system may partition resources based on the requirements of each layer. Furthermore, different users may categorize different slices, and different services may be provided based on the slicing (i.e., partitioning the bandwidth resources). Slicing may also allocate bandwidths to users in the network, further scheduling of the bandwidths. Slicing in layer 2 mandates allocation of PRBs to each slice, and the PRBs may be allocated per time units.

For radio resource partitioning of slices, the radio resource management (RRM) policy inputs specified according the 3rd generation partnership project (3GPP) for each slice may include a dedicated PRB allocation ratio (e.g., a dedicated PRB allocation threshold), a minimum PRB allocation ratio (e.g., a minimum PRB allocation threshold), and a maximum PRB allocation ratio (e.g., a maximum PRB allocation threshold).

The dedicated PRB allocation ratio may specify a percentage of the network slice that is dedicated for resources for the network slice such that other slices may not be able to utilize the dedicated sources. That is, other slices should not be allocated to the dedicated bandwidths. The sum of the dedicated PRB allocation ratios for each slice may be less than or equal to 100%. The minimum PRB allocation ratio may specify a minimum percentage of PRBs to be received for a particular slice. In some embodiments, the scheduler (e.g., a distributing unit of a base station) may be configured to prioritize the slices such that the minimum PRB allocation ratios are achieved for each slice. The maximum PRB allocation ratio may specify a maximum cut-off percentage of PRBs to be allocated for a network slice.

The dedicated PRB allocation ratio, the minimum PRB allocation ratio, and the maximum PRB allocation ratio may be specified by the network and/or dynamically changed during operation. Furthermore, the dedicated PRB allocation ratio, the minimum PRB allocation ratio, and the maximum PRB allocation ratio may vary for each slice in a slot, as is described in further detail below.

FIG. 1 is a flowchart of a method for PRB scheduling for network slices, according to an embodiment. In operation 102, the system may define a predetermined window length. Unlike related art methods which schedule PRBs on a per slot without considering previous or subsequent scheduling in other slots, the system according to embodiments may define a predetermined window length (e.g., a time length) that includes a plurality of slots, where each slot corresponds to a PRB scheduling entry for the number of network slices configured for the network. For example, a window length may be defined as 10 slots, and each slot may be configured for scheduling 100 PRBs. Thus, in the above example, the window length is defined such that the scheduling of 1000 PRBs may be considered for each slot as is described in more detail below.

In operation 104, the system may determine a number of PRBs to be allocated for each slot over the predetermined window length according to slice configurations. The slice configuration for each slot may include a plurality of slices. One example embodiment is described with respect to Table 1, although other slice configurations may be implemented as will be understood by one of ordinary skill in the art from the disclosure herein.

TABLE 1

| Slice | Minimum PRB Allocation Ratio | Dedicated PRB Allocation Ratio | Maximum PRB Allocation Ratio |
|---|---|---|---|
| S1 | 10% | 5% | 60% |
| S2 | 20% | 10% | 80% |
| S3 | 40% | 30% | 100% |
| S4 | 30% | 0% | 100% |

As shown in Table 1, the system may be configured with four slices, slices S1-S4. Slice S1 may include a minimum PRB allocation ratio of 10%, a dedicated PRB allocation ratio of 5% and a maximum PRB allocation ratio of 60%. Slice S2 may include a minimum PRB allocation ratio of 20%, a dedicated PRB allocation ratio of 10% and a maximum PRB allocation ratio of 80%. Slice S3 may include a minimum PRB allocation ratio of 40%, a dedicated PRB allocation ratio of 30% and a maximum PRB allocation ratio of 100%. Slice S4 may include a minimum PRB allocation ratio of 30%, a dedicated PRB allocation ratio of 0% and a maximum PRB allocation ratio of 100%.

In the example embodiment, over the predetermined window of 10 slots, the system may allocate 1000 PRBs with 100 PRBs per slot. Thus, the system may determine the minimum number of PRBs to be allocated, the dedicated number PRB of PRBs to be allocated, and the maximum number of PRBs to be allocated for each slot, based on the number of PRBs to be scheduled over the predetermined time window, as shown in Table 2.

TABLE 2

| Slice | Minimum Number of PRBs Over Window | Dedicated Number of PRBs Over Window | Maximum Number of PRBs Over Window |
|---|---|---|---|
| S1 | 100 | 50 | 600 |
| S2 | 200 | 100 | 800 |
| S3 | 400 | 300 | 1000 |
| S4 | 300 | 0 | 1000 |

In operation 106, the system may allocate a number of PRBs for a slot. The number of PRBs may correspond to the number of PRBs for which the slot is configured for scheduling. That is, in operation 106 with the above example, the system may allocate 100 PRBs for a slot. The system may allocate the PRBs based on a predetermined allocation distribution and/or a random allocation distribution. Example embodiments showing PRB allocation per slot are described with respect to FIG. 2.

Operations 108, 110 and 112 represent multiple predetermined PRB allocation conditions that the system may utilize for determining whether to disable a slice, or to enable a slice (or determine a slice should remain enabled). The system may determine to disable/enable a slice based on one of the predetermined PRB allocation conditions, multiple of the predetermined PRB allocation conditions, or on all of the predetermined PRB allocation conditions. Furthermore, the system may perform operations 108, 110 and 112 in any order, and any of operations 108, 110 and 112 may be omitted. Furthermore, although operations 108, 110, and 112 are described with respect to a single slice, each of the determinations of operations 108, 110 and 112 may be performed for each slice in each slot, as is shown in example embodiments to be described with reference to FIG. 2.

In operation 108, the system may determine whether a maximum PRB allocation threshold for a slice is reached. For example, referring to Table 1 and Table 2, for slice S1, the maximum PRB allocation ratio is 60%, and for the predetermined window length in the example embodiment, the maximum number of PRBs to be scheduled to slice S1 (e.g., the maximum PRB allocation threshold) is 600. Thus, the system may determine whether slice S1 has had 600 PRBs or more scheduled during the predetermined window length. Based on determining that the maximum PRB allocation threshold for the slice is reached, in operation 114, the system may disable the slice. Based on determining that the maximum PRB allocation threshold for the slice is not reached, the system may proceed to operation 110, or, in some embodiments, the system may terminate the process.

In operation 110, the system may determine whether a dedicated PRB allocation threshold for a slice is met, and whether a remaining number of PRBs to be scheduled in the window are less than a dedicated PRB allocation threshold for the remaining slices. Although operation 110 is shown as a single operation, multiple determinations may be made, and the operation 110 may be split. That is, the system may make a separate determination as to whether the dedicated PRB allocation threshold for the slice is met, and then end the process when the dedicated PRB allocation threshold for the slice is not met.

Referring to Table 1 and Table 2, in example embodiments, for slice S1, the system may determine whether the number of PRBs allocated to slice S1 reaches 50 PRBs, as 50 PRBs corresponds to the dedicated PRB allocation threshold. Based on determining that the dedicated PRB allocation threshold has been reached for slice S1, the system may determine whether a remaining number of PRBs to be allocated within the predetermined window length is less than a dedicated PRB allocation threshold for remaining slices S2-S4. In the example embodiment, the system may determine whether the remaining number of PRBs to be scheduled in the predetermined window length is less than 100 PRBs (slice S2) plus 300 PRBs (slice S3) plus 0 PRBs (slice S4). If the remaining number of PRBs to be allocated within the predetermined window length is less than the dedicated PRB allocation threshold for remaining slices S2-S4, the system may disable slice S1. Otherwise, the system may proceed to operation 112, or alternatively, the system may end the process.

In operation 112, the system may determine whether a minimum PRB allocation threshold of a slice is reached, and whether a minimum PRB allocation threshold of the remaining slices is reached. Although operation 112 is shown as a single operation, multiple determinations may be made, and the operation 112 may be split. Referring to Table 1 and Table 2, the system may determine whether the minimum number of PRBs to be scheduled over the window have been scheduled in slice S1. That is, in the example embodiment, the system may determine whether 100 PRBs have been scheduled to slice S1. If the minimum PRB allocation threshold is not reached in slice S1, the system may terminate the process. If the minimum PRB allocation threshold is reached is slice S1, the system may determine whether the minimum PRB allocation threshold for remaining slices S2-S4 has been reached. That is, the system may determine whether slice S2 has had 200 PRBs scheduled, whether slice 3 has had 400 PRBs scheduled, and/or whether slice S4 has had 300 PRBs scheduled. If the system determines that none of the minimum PRB allocation thresholds for slices S2-S4 have not been reached, the system may determine to disable slice S1. Alternatively, the system may determine to disable slice S1 when any number of the minimum PRB allocation thresholds for slices S2-S4 have not been reached. If the system determines that all slices have met their minimum PRB allocation thresholds, the system may determine to enable slice S1 or determine that slice S1 should remain enabled.

In the above operations 108, 110, 112, reference to the process ending may refer to the system determining that the network slice is to enable, or that an enabled network slice is to remain enabled for the next slot. Furthermore, the operations of FIG. 1 may be performed for each slot of the plurality of slots that corresponds to the predetermined window length.

When a slice is determined to be enabled or an enabled slice is determined to remain enabled, the system may select users with the enabled slice for allocation the PRBs. If the slice is disabled, then the UEs corresponding to the disabled slice may be skipped or omitted. UE shortlisting may occur based on a desired scheduling policy (e.g., based on proportional fairness, highest throughput, round robin, etc.). Based on the scheduling policy, there may be a prioritized UE list that is formed based on which scheduling shortlist may occur. UEs or bears from the prioritized list may not be selected for scheduling if the system decides to disable a corresponding slice.

FIG. 2 is a table showing an example implementation of a slice configuration over a predetermined window length, according to an embodiment. FIG. 2 shows an example where the slice configuration of Table 1 and Table 2 is implemented over a window length of 10 slots, where 100 PRBs are assigned to each slot. Table 2 shows the number of PRBs allocated to each slice in each slot, as well as adjusting the number of PRBs remaining to the a minimum number of PRBs over the predetermined window length, the dedicated number of PRBs over the predetermined window length, and the maximum number of PRBs over the predetermined window length for each slice in each slot, as well as a minimum number of PRBs for remaining slices with respect to an identified slice (e.g., in row 1, the 900 minimum number of PRBs corresponds to the minimum number of PRBs for slices S2-S4 in slot 1), as well as a dedicated number of PRBs for remaining slices with respect to an identified slice. FIG. 2 also shows the outcome of each operation 108, 110 and 112 that are performed for each slice in each slot. Lastly, FIG. 2 shows whether the slice is disabled or enabled after the determinations of operations 108, 110 and 112.

As shown in FIG. 2, as PRBs are distributed, the changes in PRB requirements are tracked, and the determinations of operations 108, 110 and 112 are performed. In slot 3, network slice S1 has reached the minimum PRB allocation threshold of 100 PRBs, and the remaining slices S2-S4 have not reached their respective minimum PRB allocation thresholds. Thus, the determination of operation 112 is "TRUE," and therefore the system determines to disable network slice S1. PRBs are continued to be assigned to slices S2-S4. In slot 7, network slice S2 has reached the minimum PRB allocation threshold of 200 PRBs, and the remaining slices S3-S4 have not reached their respective minimum PRB allocation thresholds. Thus, the determination of operation 112 is "TRUE," and therefore the system determines to disable network slice S2. Table 3 shows the results of the example embodiment of FIG. 2, where the actual achieved result of the minimum PRB allocation is compared with the predefined minimum PRB allocation ratios.

TABLE 3

| | Achieved Result | Minimum PRB Allocation Ratio |
|---|---|---|
| S1 | 10% | 10% |
| S2 | 24% | 20% |
| S3 | 37% | 40% |
| S4 | 29% | 30% |

FIG. 3 is a flowchart of a method of PRB scheduling, according to an embodiment. In operation 302, the system may determine a number of PRBs to be allocated in a predetermined window length to a plurality of slices for each slot of a plurality of slots within the predetermined window length. In operation 304, the system may allocate the number of PRBs to at least one of the plurality of slices in one slot of the plurality of slots. In operation 306, the system may determine whether at least one slice of the plurality of slices satisfies at least one predetermined PRB allocation condition. In operation 308, the system may disable the at least one slice based on determining that the at least one slice satisfies the at least one predetermined PRB allocation condition. In operation 310, the system may determine to enable the at least one slice or that the at least one slice is to remain enabled based on determining that the at least one slice does not satisfy the at least one predetermined PRB allocation condition.

Based on the provided systems and methods disclosed herein, slices which receive a majority of scheduling initially during the predetermined window length become deprioritized as the PRBs are assigned across the slots in the predetermined window length, and the slices that were deprioritized earlier receive more PRBs to achieve the minimum PRB allocation threshold more reliably and more closely to the parameters defined for the system.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIG. 1 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc. services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
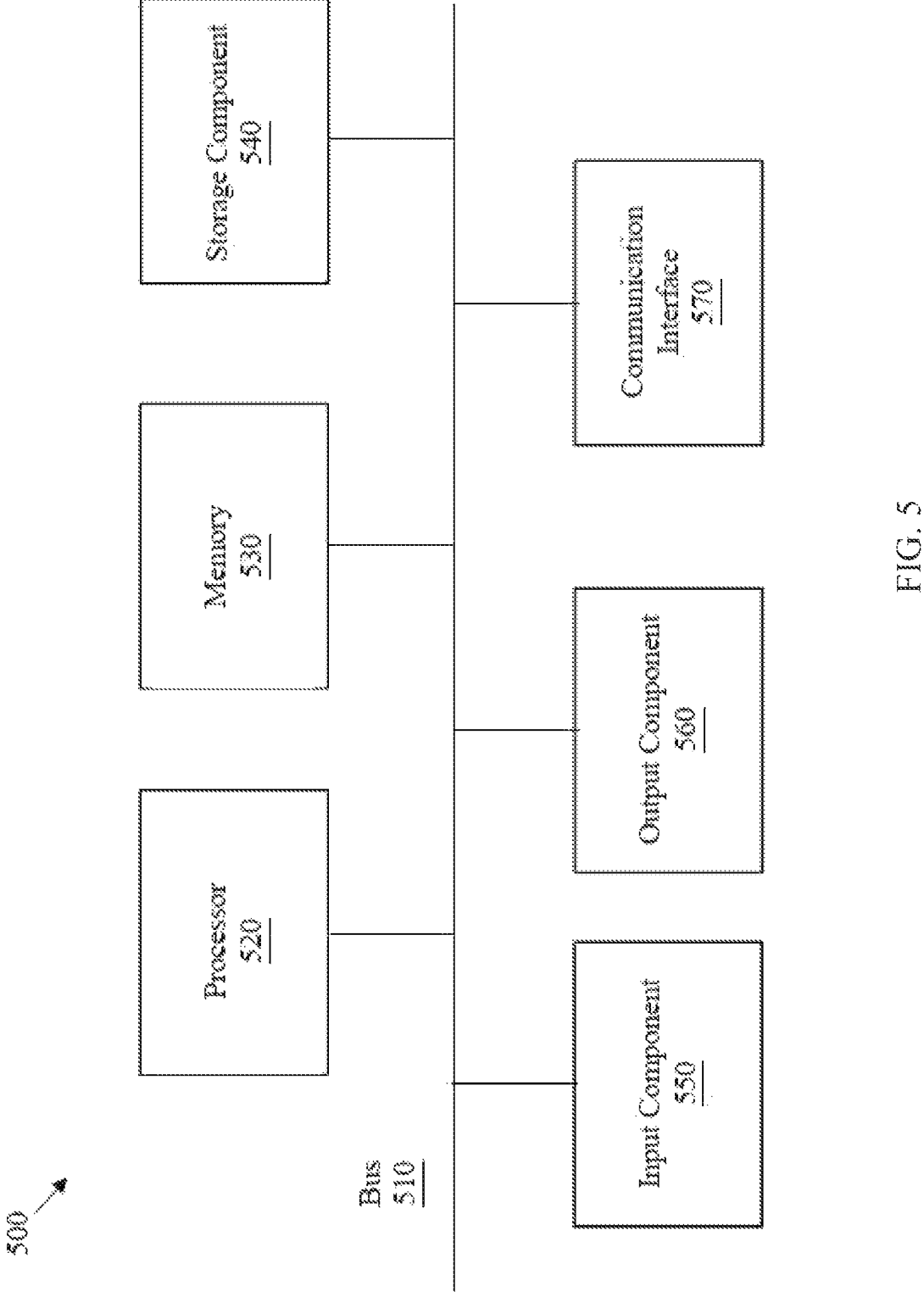
FIG. 5 is a diagram of example components of a device according to an embodiment.

FIG. 5 is a diagram of example components of a device 500. Device 500 may correspond to user device 410 and/or platform 420. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 1-3 may be implemented by or using any one of the elements illustrated in FIGS. 4 and 5.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of physical resource block (PRB) scheduling, comprising:

determining a number of PRBs to be allocated in a predetermined window length to a plurality of slices for each slot of a plurality of slots within the predetermined window length;

allocating the number of PRBs to at least one of the plurality of slices in one slot of the plurality of slots;

determining whether at least one slice of the plurality of slices satisfies at least one predetermined PRB allocation condition; and disabling the at least one slice based on determining that the at least one slice satisfies the at least one predetermined PRB allocation condition, wherein the at least one predetermined PRB allocation condition is at least one condition as to whether a number of PRBs allocated to the at least one slice exceeds at least one threshold that is predefined for the predetermined window length comprising the plurality of slots, and wherein the allocating and the determining whether the at least slice satisfies the at least one predetermined PRB allocation condition are performed on a per slot-basis.

2. The method of claim 1, wherein determining whether the at least one slice of the plurality of slices satisfies the at least one predetermined PRB allocation condition comprises determining whether a maximum PRB allocation threshold for the at least one slice is reached, and wherein the disabling of the at least one slice is performed based on determining that the maximum PRB allocation threshold for the at least one slice is reached.

3. The method of claim 1, wherein determining whether the at least one slice of the plurality of slices satisfies the at least one predetermined PRB allocation condition comprises:

determining whether a first dedicated PRB allocation threshold for the at least one slice is reached; and wherein the disabling of the at least one slice is performed based on determining that the first dedicated PRB allocation threshold for the at least one slice is reached.

4. The method of claim 3, wherein determining whether the at least one slice of the plurality of slices satisfies the at least one predetermined PRB allocation condition further comprises:

based on determining that the first dedicated PRB allocation threshold for the at least one slice is reached, determining whether a remaining number of PRBs to be allocated within the predetermined window length is less than a second dedicated PRB allocation threshold for remaining slices of the plurality of slices other than the at least one slice; and wherein the disabling of the at least one slice is further performed based on determining that the remaining number of PRBs to be allocated within the predetermined window length is less than the second dedicated PRB allocation threshold for the remaining slices of the plurality of slices other than the at least one slice.

5. The method of claim 1, wherein determining whether the at least one slice of the plurality of slices satisfies the at least one predetermined PRB allocation condition comprises determining whether a first minimum PRB allocation threshold for the at least one slice is reached, and wherein the disabling of the at least one slice is performed based on determining that the first minimum PRB allocation threshold for the at least one slice is reached.

6. The method of claim 5, wherein determining whether the at least one slice of the plurality of slices satisfies the at least one predetermined PRB allocation condition further comprises determining whether a second minimum PRB allocation threshold for remaining slices of the plurality of slices other than the at least one slice is reached, and wherein the disabling of the at least one slice is further performed based on determining that the second minimum PRB allocation threshold for the remaining slices of the plurality of slices other than the at least one slice is not reached.

7. The method of claim 1, further comprising determining to either enable the at least one slice or that the at least one slice is to remain enabled based on determining that the at least one slice does not satisfy the least one predetermined PRB allocation condition.

8. The method of claim 7, wherein the at least one predetermined PRB allocation condition comprises at least one of:

a first condition of a maximum PRB allocation threshold for the at least one slice being reached;

a second condition of a first dedicated PRB allocation threshold for the at least one slice being reached and a remaining number of PRBs to be allocated within the predetermined window length being less than a second dedicated PRB allocation threshold for remaining slices of the plurality of slices other than the at least one slice; and a third condition of a first minimum PRB allocation threshold for the at least one slice being reached and a second minimum PRB allocation threshold for the remaining slices of the plurality of slices other than the at least one slice not being reached.

9. The method of claim 7, wherein the at least one predetermined PRB allocation condition comprises each of:

a first condition of a maximum PRB allocation threshold for the at least one slice being reached;

a second condition of a first dedicated PRB allocation threshold for the at least one slice being reached and a remaining number of PRBs to be allocated within the predetermined window length being less than a second dedicated PRB allocation threshold for remaining slices of the plurality of slices other than the at least one slice; and a third condition of a first minimum PRB allocation threshold for the at least one slice being reached and a second minimum PRB allocation threshold for the remaining slices of the plurality of slices other than the at least one slice not being reached.

10. A system for physical resource block (PRB) scheduling, comprising:

at least one memory storing instructions; and at least one processor configured to execute the instructions to:

determine a number of PRBs to be allocated in a predetermined window length to a plurality of slices for each slot of a plurality of slots within the predetermined window length;

allocate the number of PRBs to at least one of the plurality of slices in one slot of the plurality of slots;

determine whether at least one slice of the plurality of slices satisfies at least one predetermined PRB allocation condition; and disabling the at least one slice based on determining that the at least one slice satisfies the at least one predetermined PRB allocation condition, wherein the at least one predetermined PRB allocation condition is at least one condition as to whether a number of PRBs allocated to the at least one slice exceeds at least one threshold that is predefined for the predetermined window length comprising the plurality of slots, and wherein the allocating and the determining whether the at least slice satisfies the at least one predetermined PRB allocation condition are performed on a per slot-basis.

11. The system of claim 10, wherein the at least one processor is configured to execute the instructions to determine whether the at least one slice of the plurality of slices satisfies the at least one predetermined PRB allocation condition by determining whether a maximum PRB allocation threshold for the at least one slice is reached, and wherein the at least one processor is configured to execute the instructions to disable the at least one slice based on determining that the maximum PRB allocation threshold for the at least one slice is reached.

12. The system of claim 10, wherein the at least one processor is configured to execute the instructions to determine whether the at least one slice of the plurality of slices satisfies the at least one predetermined PRB allocation condition by:

determining whether a first dedicated PRB allocation threshold for the at least one slice is reached; and wherein the at least one processor is configured to execute the instructions to disable the at least one slice based on determining that the first dedicated PRB allocation threshold for the at least one slice is reached.

13. The system of claim 12, wherein the at least one processor is further configured to execute the instructions to determine whether the at least one slice of the plurality of slices satisfies the at least one predetermined PRB allocation condition by:

based on determining that the first dedicated PRB allocation threshold for the at least one slice is reached, determining whether a remaining number of PRBs to be allocated within the predetermined window length is less than a second dedicated PRB allocation threshold for remaining slices of the plurality of slices other than the at least one slice; and wherein the at least one processor is further configured to execute the instructions to disable the at least one slice based on determining that the remaining number of PRBs to be allocated within the predetermined window length is less than the second dedicated PRB allocation threshold for the remaining slices of the plurality of slices other than the at least one slice.

14. The system of claim 10, wherein the at least one processor is configured to execute the instructions to determine whether the at least one slice of the plurality of slices satisfies the at least one predetermined PRB allocation condition by determining whether a first minimum PRB allocation threshold for the at least one slice is reached, and wherein the at least one processor is configured to execute the instructions to disable the at least one slice based on determining that the first minimum PRB allocation threshold for the at least one slice is reached.

15. The system of claim 14, wherein the at least one processor is further configured to execute the instructions to determine whether the at least one slice of the plurality of slices satisfies the at least one predetermined PRB allocation condition by determining whether a second minimum PRB allocation threshold for remaining slices of the plurality of slices other than the at least one slice is reached, and wherein the at least one processor is further configured to execute the instructions to disable the at least one slice is further performed based on determining that the second minimum PRB allocation threshold for the remaining slices of the plurality of slices other than the at least one slice is not reached.

16. The system of claim 10, wherein the at least one processor is configured to execute the instructions to determine to either enable the at least one slice or that the at least one slice is to remain enabled based on determining that the at least one slice does not satisfy the least one predetermined PRB allocation condition.

17. The system of claim 16, wherein the at least one predetermined PRB allocation condition comprises at least one of:

a first condition of a maximum PRB allocation threshold for the at least one slice being reached;

a second condition of a first dedicated PRB allocation threshold for the at least one slice being reached and a remaining number of PRBs to be allocated within the predetermined window length being less than a second dedicated PRB allocation threshold for remaining slices of the plurality of slices other than the at least one slice; and a third condition of a first minimum PRB allocation threshold for the at least one slice being reached and a second minimum PRB allocation threshold for the remaining slices of the plurality of slices other than the at least one slice not being reached.

18. The system of claim 16, wherein the at least one predetermined PRB allocation condition comprises each of:

a first condition of a maximum PRB allocation threshold for the at least one slice being reached;

a second condition of a first dedicated PRB allocation threshold for the at least one slice being reached and a remaining number of PRBs to be allocated within the predetermined window length being less than a second dedicated PRB allocation threshold for remaining slices of the plurality of slices other than the at least one slice; and a third condition of a first minimum PRB allocation threshold for the at least one slice being reached and a second minimum PRB allocation threshold for the remaining slices of the plurality of slices other than the at least one slice not being reached.

19. A non-transitory computer-readable storage medium storing instructions that, when executed by at least one processor, cause the at least one processor to:

determine a number of physical resource blocks (PRBs) to be allocated in a predetermined window length to a plurality of slices for each slot of a plurality of slots within the predetermined window length;

allocate the number of PRBs to at least one of the plurality of slices in one slot of the plurality of slots;

determine whether at least one slice of the plurality of slices satisfies at least one predetermined PRB allocation condition; and disabling the at least one slice based on determining that the at least one slice satisfies the at least one predetermined PRB allocation condition, wherein the at least one predetermined PRB allocation condition is at least one condition as to whether a number of PRBs allocated to the at least one slice exceeds at least one threshold that is predefined for the predetermined window length comprising the plurality of slots, and wherein the allocating and the determining whether the at least slice satisfies the at least one predetermined PRB allocation condition are performed on a per slot-basis.

20. The storage medium of claim 19, wherein the instructions, when executed by the at least one processor, cause the at least one processor to determine whether the at least one slice of the plurality of slices satisfies the at least one predetermined PRB allocation condition by determining whether a maximum PRB allocation threshold for the at least one slice is reached, and wherein the instructions, when executed by the at least one processor, further cause the at least one processor to disable the at least one slice based on determining that the maximum PRB allocation threshold for the at least one slice is reached.

* * * * *